Dec. 26, 1944. W. D. MOUNCE 2,366,043
AUTOMATIC GAIN ADJUSTING DEVICE FOR REFLECTION SEISMOGRAPHS
Filed June 26, 1936 3 Sheets-Sheet 1

Whitman D. Mounce Inventor
By W. F. Weiqester Attorney

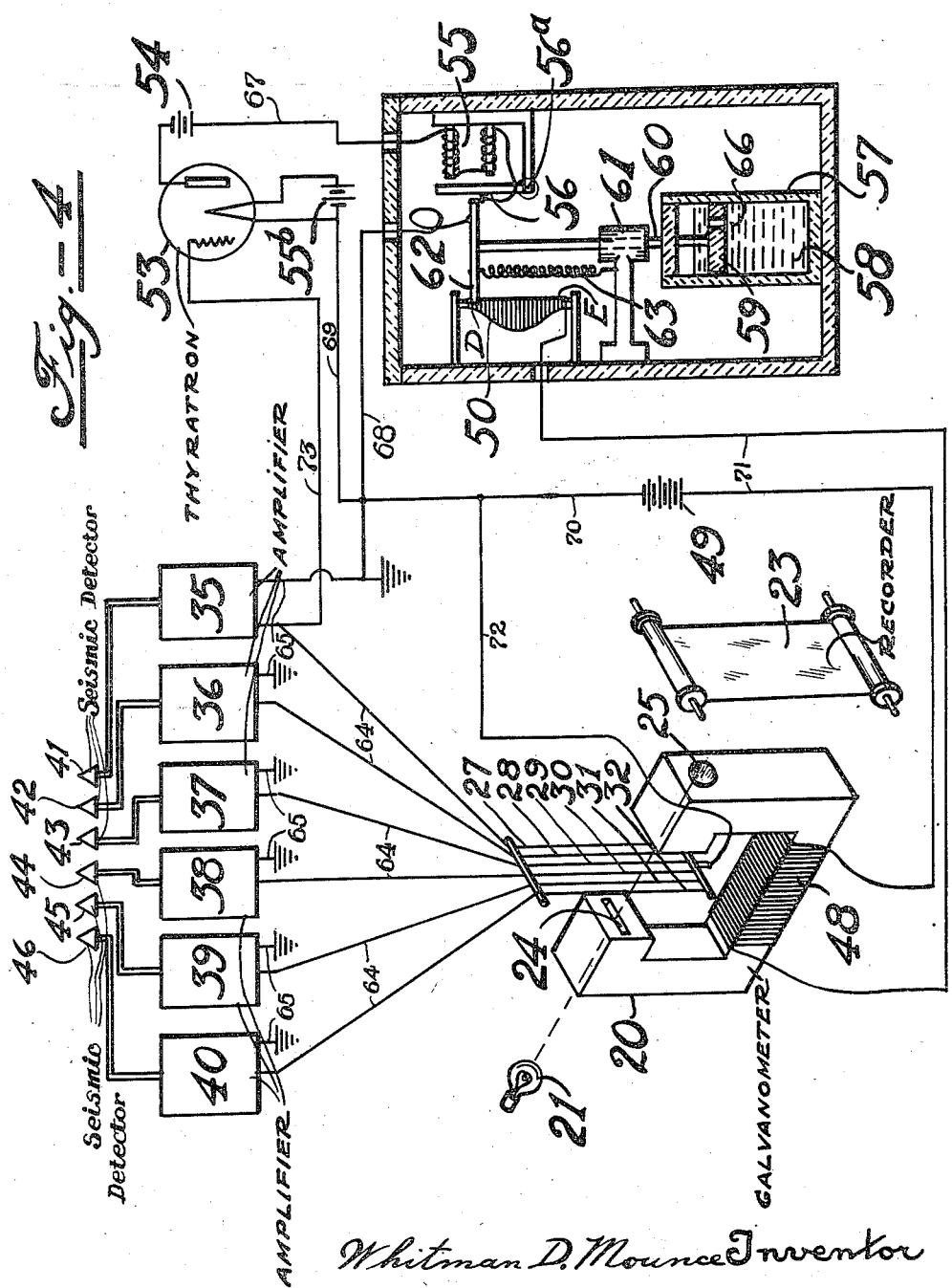

Patented Dec. 26, 1944

2,366,043

UNITED STATES PATENT OFFICE 2,366,043

AUTOMATIC GAIN ADJUSTING DEVICE FOR REFLECTION SEISMOGRAPHS

Whitman D. Mounce, Houston, Tex., assignor to Standard Oil Development Company, a corporation of Delaware Application June 26, 1936, Serial No. 87,418

5 Claims. (Cl. 177—352)

This invention relates to improvements in the recording of seismic vibrations. More particularly it relates to an improved method and apparatus for adjusting the recorded energy from an explosion of dynamite in the ground.

The invention will be fully understood from the following description taken in connection with the accompanying drawings, in which latter—

Fig. 4 is a diagrammatic representation of a preferred form of apparatus for carrying out the invention.

In seismic prospecting it is customary to create seismic energy at a source and to receive the seismic energy at a plurality of detectors spaced from the source. The seismic energy received at the detectors is transformed into pulsations of electric energy, which are then amplified and recorded. The average amplitude of the energy as received by the detectors or seismographs falls off rapidly with time after the arrival of the first impulses from the shot.

Figure 1:
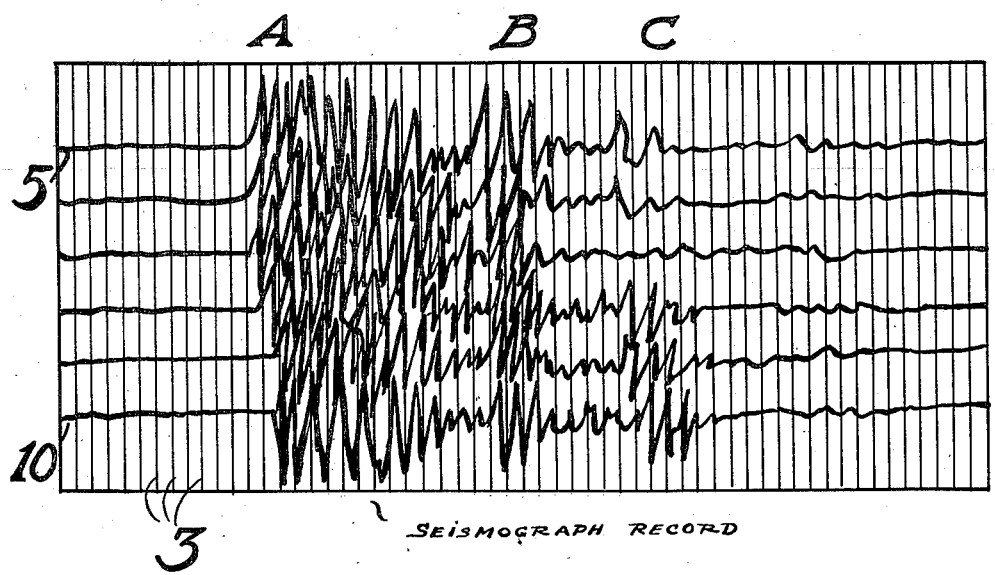
Fig. 1 is a representation of the seismograph record ordinarily obtained.

Referring to Fig. 1, a record obtained when using six detectors is illustrated in which the lines 3 designate time intervals, and the traces 5 to 10 inclusive represent the amplitudes of motion of the recording elements of the detectors as determined by the motion of the ground at the respective positions of the detectors. As shown on the record, the amplitude of the energy received at the first part of the record designated A—B is so great that the traces representing the amplitudes of each detector cover the traces of the adjacent detectors. As a result, it is extremely difficult to pick the time of arrival of any one of the series of impulses from the shot within this interval of time A—B. From the points designated B—C on the record, the received energy from the charge is of the desired amplitude, thereby enabling the observer to pick the time of arrival of any of the series of impulses with a high degree of accuracy. From the point designated C to the end of the record, the amplitude of the received energy has fallen off to such a degree that the information contained on the record is of little practical value. Consequently, it has been the practice to shoot at least two more charges of dynamite, one of a smaller quantity of explosive than the first to reduce the recorded amplitude, which will enable the observer to decipher the information contained in the interval of time A—B, and another larger charge, which will increase the recorded amplitude from C to the end of the record, whereby the arrival time of any of the series of impulses in the interval of time may be observed with the necessary degree of accuracy.

Figure 2:
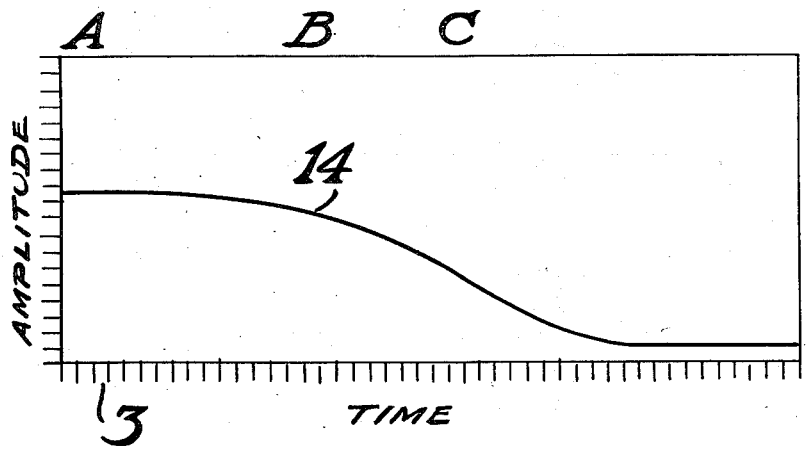
Fig. 2 is a composite representation of the average amplitudes of the energy received on a large number of typical records similar to that illustrated in Fig. 1 and extending from the point A to the right-hand end of the record of Fig. 1.

Observation of a large number of reflection seismograph records similar to the one illustrated in Fig. 1 shows that the average amplitude of the received energy falls off with time after the first impulse in a manner graphically illustrated in Fig. 2. Here the curve 14 represents the manner in which the average amplitude of the recorded energy decreases with time after the arrival of the first impulse from the explosion at point A to the end of the record.

Figure 3:
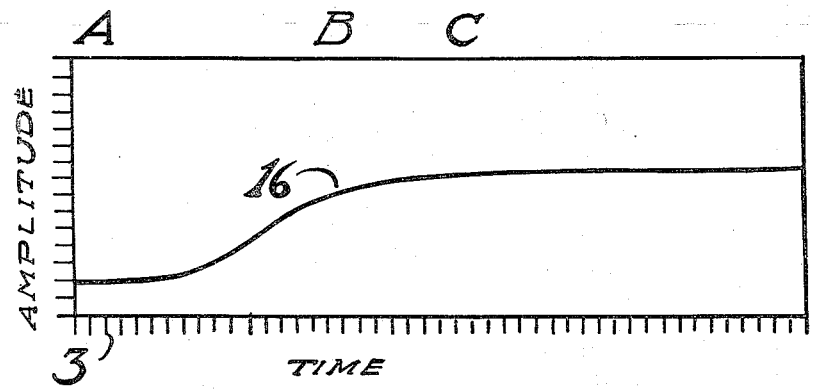
Fig. 3 is a graphical representation of the adjustment of the gain of the receiving system necessary to receive the energy at the recorder with constant average amplitude from the point A to the right-hand end of the record of Fig. 1.

It is an object of this invention to introduce into the receiver system an automatic amplitude adjusting device which operates simultaneously on each of the several detector-amplifier-galvanometer combinations of a seismic receiving station in such a way that the amplification of each combination is changed with time as shown in Fig. 3, in which the curve 16 is the reciprocal of the curve 14 shown in Fig. 2.

A preferred form of apparatus for accomplishing this adjustment is illustrated in Fig. 4, in which the numeral 20 represents a multi-string galvanometer with a light source 21 and recorder 23. The light from light source 21 passes through slots 24 and 25 and falls upon the film of recorder 23. The galvanometer is provided with strings 27 to 32 inclusive, which are disposed in the path of the light from the source 21. The strings 27 to 32 are connected respectively to amplifiers 35 to 40 inclusive, as illustrated in Fig. 4. The amplifiers 35 to 40 inclusive are connected to detectors 41 to 46 inclusive. The detectors are ordinarily disposed at or near the surface of the earth in position to receive seismic vibrations from a suitable shot-point, not shown, at which a charge of dynamite may be exploded. The detectors 41 to 46 are operative to transform the seismic vibrations into corresponding pulsations of electric energy which after amplification are caused to deflect the strings 27 to 32. As shown in the diagram, detector 41 is operatively connected to amplifier 35 and amplifier 35 is connected directly to recorder string 27. Similarly, detectors 42 through 46 are connected respectively to amplifiers 36 through 40 and to recorder strings 28 through 32. For a given string current the deflection of the string depends directly on the current in the field coil 48, as supplied by a battery 49 through a resistance 50. A kick-off device is connected to the amplifier 35 and to a means for controlling the amplitude of the resulting motions of the elements 27 to 32 as a predetermined function of time as follows:

Now when the first impulse from the shotpoint is received by the detector 41 and amplifier 35, a positive voltage is applied to the grid of a thyratron 53 which latter sends current from a battery 54 through relay coils 55, thereby releasing a trigger 56 pivotally mounted at 56a. The filament battery for the thyratron 53 is designated 55b. The electromagnetic field of the galvanometer is varied as a predetermined function of time by varying the resistance 50 as follows. A cylinder 57 contains a suitable liquid 58, and a piston 59 is mounted for reciprocation within this cylinder. The piston 59 carries a piston rod 60 which is mounted for reciprocating motion in a guide 61. The piston rod 60 is provided with a contact arm 62 one end of which bears slidably against the variable resistance 50 and is connected in the circuit through the coil 48. The latch 56 normally holds the contact arm 62 at the position of greatest resistance of the resistor 50, designated D. A tension spring 63 is connected to the contact arm 62 and to the guide 61 to normally exert pull upon the contact arm to draw it to position E in which the resistor 50 has a decreased value. The spring 63 accomplishes this function when the latch 56 releases the contact arm 62.

The piston 59 is caused to move through the cylinder 57 with a uniform predetermined velocity as follows: The piston 59 is provided with an orifice 66 to permit flow of the liquid 58 therethrough to opposite sides of the piston. The pressure upon the piston exerted by the spring 63 forces the liquid 58 through the orifice 66, and by proper choice of the spring 63, liquid 58 and diameter of the orifice 66, the piston 59 moves through the cylinder with a uniform predetermined velocity.

For proper adjustment, the time required for the piston 59 to move the length of resistance 50 is chosen to be the interval of time A to the end of the record shown on Fig. 1. The resistance 50 is made by winding wire of suitable resistance over a form, the shape of which is determined by the slope of the curve 16 shown in Fig. 3, so as to decrease the amount of resistance in proportion to the decrease of average amplitude of the seismic energy. Hence, when the time required for the contact arm 62 to move the length of the resistance 50 is chosen to be the same as the total time shown in Fig. 2, the sensitivity of the galvanometer 20 varies with time as shown in Fig. 3 and the amplitude of each trace is approximately constant over the entire record.

Figure 5:
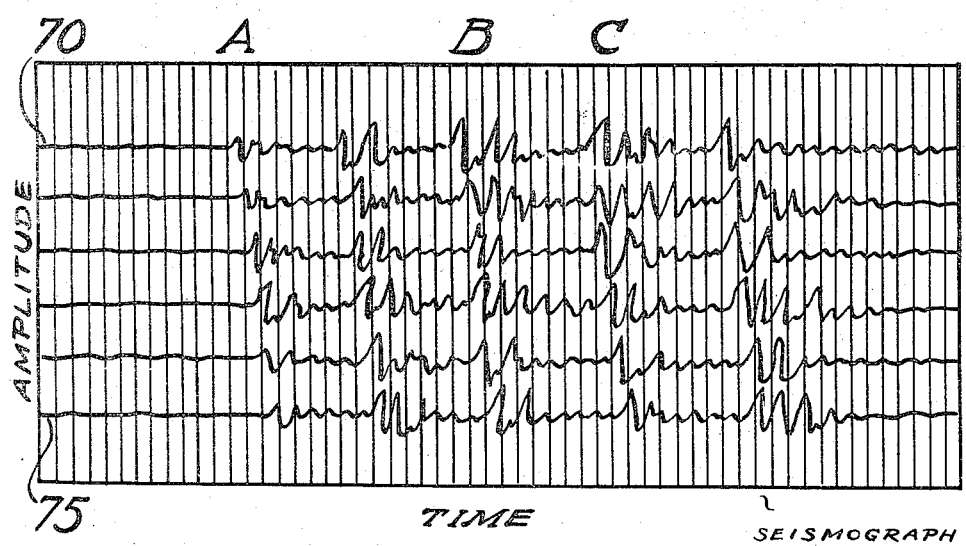
Fig. 5 is a representation of the seismograph record obtained with this invention.

The time scale of Fig. 5 is the same as that of Fig. 1, and in the record illustrated the points A, B and C in Fig. 5 correspond with time to the points similarly designated on the record illustrated in Fig. 1. It will be seen from inspection of Fig. 5 that the amplitudes of each trace during the time interval from A to B have been reduced so that the traces of adjacent detectors do not overlap each other. The traces from B to C have been substantially unaffected. The amplitude of the traces from C to the end of the record have been amplified. This makes the average amplitude of motions of the responses of the recorder substantially uniform over the entire record. This is accomplished smoothly and continuously to conform with the curve illustrated in Fig. 3. The record illustrated in Fig. 5 is obtained from a shot similar to the shot used in obtaining the record of Fig. 1 with the gain of each combination changed with time, as indicated in Fig. 3.

The various detectors shown in Figure 4 are numbered in order to facilitate the tracing of the several circuits involved. The outputs of the amplifiers are connected by conductors 64 to strings 27-32 inclusive, of the galvanometer. The several amplifiers are grounded by conductors 65. Amplifier 35 has connected to its output an additional conductor 73 which is connected to the grid of thyratron 53. The plate of the circuit is connected by conductors 67 to relay coils 55 which, in turn, are connected to trigger 56. When contact arm 62 is in contact with trigger 56 the current passes from trigger 56 through contact arm 62 and conductor 68 to ground wire 65 of amplifier 35. When trigger 56 is withdrawn from contact arm 62 the plate circuit is broken. The cathode of thyratron 53 is connected to ground wire 68 by conductor 69.

The negative side of battery 49 is connected by conductor 70 to ground wire 68. The positive side of the battery is connected to conductor 71 which is wrapped around a core of the galvanometer to form field winding 48 and is connected to contact arm 62 through resistance 50 and thence to the ground through conductor 68.

The various strings of the galvanometer are connected to conductor 72 which is connected to conductor 70 and thus to conductor 68 and the ground.

While automatic means have been shown and described for simultaneously varying the amplitude of movement of the responsive elements as traced upon the recording sheet, it will be understood that the operation may be done manually by the operator and some of the advantages of the invention will be retained.

Various changes and alternate arrangements may be made within the scope of the appended claims, in which it is my intention to claim all novelty inherent in the art as broadly as the prior art permits.

I claim:

1. In seismic prospecting apparatus for receiving seismic waves the amplitudes of which decrease as a function of time, and converting said waves into electrical pulsations of corresponding amplitudes, means for conducting said pulsations to a recorder including an electromagnet magnetized by current flowing in a coil of wire, elements adapted to respond to said impulses so disposed in the field of the electromagnet that their response is controllable by the magnetic field resulting from the current in said coil of wire, a resistance for controlling the current flowing in said coil of wire and means for decreasing this resistance at a rate which is in substantially inverse proportion to the rate of decrease of the amplitudes of the received waves, whereby the average amplitudes of the recorded waves are maintained substantially constant.

2. Seismic prospecting apparatus comprising means for converting seismic waves, the amplitudes of which decrease as a function of time, into electrical pulsations of corresponding amplitudes, a recorder connected to said means having in an electromagntic field a plurality of responsive elements adapted to be activated proportionately to the amplitudes of the pulsations and means for increasing the electromagnetic field and, thereby, the responsiveness of said elements at a rate corresponding to the rate of decrease of the amplitudes of said pulsations.

3. Seismic prospecting apparatus comprising means for receiving seismic waves, the amplitudes of which decrease as a function of time, and converting them into electrical pulsations of corresponding magnitudes, a recorder connected to said means having in an electromagnetic field a plurality of responsive elements adapted to be activated proportionately to the amplitudes of the pulsations, controlling means associated with said recorder for normally maintaining said electromagnetic field at a reduced strength and comprising means for increasing the strength of said field, and means actuated by the first electrical impulse transmitted by said receiving means for setting said field-strength-increasing means into operation, whereby the strength of said magnetic field and, consequently, the responsiveness of said responsive elements increases as the amplitudes of the electrical impulses decrease.

4. Seismic apparatus, according to the preceding calim, in which means are included for controlling the rate of increase of strength of the magnetic field.

5. Seismic prospecting apparatus comprising means for receiving seismic waves, the amplitudes of which decrease as a function of time, and converting said waves into electrical impulses of corresponding amplitudes, a string galvanometer connected to said means having strings adapted to be activated proportionately to the amplitudes of the pulsations and a coil adapted to set up an electromagnetic field around said strings to control their sensitivity, a resistance connected to said coil, a sliding arm on said resistance, a latch for normally holding said sliding arm in a position in which the value of said resistance is high, means actuated by the first electrical impulse transmitted by said receiving means for tripping said latch and means for sliding said arm over said resistance toward its low point at a rate such that the value of said resistance decreases as the amplitudes of the electrical pulsations decrease, whereby the strength of said electromagnetic field and, thus, the sensitivity of the strings of the galvanometer, increase as the amplitudes of said pulsations decrease.

WHITMAN D. MOUNCE.